United States Patent [19]

Christy

[11] Patent Number: 5,554,279
[45] Date of Patent: Sep. 10, 1996

[54] APPARATUS FOR TREATMENT OF SEWAGE SLUDGE

[75] Inventor: Paul G. Christy, Wayne, Pa.

[73] Assignee: RDP Company, Plymouth Meeting, Pa.

[21] Appl. No.: 311,933

[22] Filed: Sep. 26, 1994

[51] Int. Cl.$^6$ .................................................. C02F 11/14
[52] U.S. Cl. .......................... 210/149; 210/178; 210/181; 210/202; 210/206
[58] Field of Search .................................. 210/609, 742, 210/764, 751, 149, 177, 178, 180, 181, 198.1, 199, 202, 206, 400

[56] References Cited

U.S. PATENT DOCUMENTS

| | | | |
|---|---|---|---|
| 1,310,382 | 7/1919 | Auld et al. | 210/710 |
| 2,021,122 | 11/1935 | Fowler | 210/609 |
| 2,026,969 | 1/1936 | Flynn | 210/769 |
| 2,043,265 | 6/1936 | Roeder | 210/609 |
| 2,297,195 | 9/1942 | Behringer . | |
| 2,723,954 | 11/1955 | Young | 210/2 |
| 3,793,841 | 2/1974 | Dozsa | 61/36 |
| 3,960,718 | 6/1976 | Lebo | 210/14 |
| 4,028,240 | 6/1977 | Manchak, Jr. | 210/59 |
| 4,043,047 | 8/1977 | Galliker | 210/748 |
| 4,043,909 | 8/1977 | Endo et al. | 210/49 |
| 4,079,003 | 3/1978 | Manchak | 210/46 |
| 4,190,372 | 2/1980 | Takagi et al. | 366/141 |
| 4,270,279 | 6/1981 | Roediger | 34/9 |
| 4,295,972 | 10/1981 | Kamei | 210/710 |
| 4,295,975 | 10/1981 | Kamei | 210/770 |
| 4,306,978 | 12/1981 | Wurtz | 210/750 |
| 4,369,111 | 1/1983 | Roediger | 210/199 |
| 4,378,886 | 4/1983 | Roediger | 209/606 |

(List continued on next page.)

FOREIGN PATENT DOCUMENTS

| | | |
|---|---|---|
| 12335 | 1/1988 | Australia . |
| 835216 | 3/1955 | United Kingdom . |

OTHER PUBLICATIONS

Wallace & Tiernan, Paste–Type Lime Slaking Systems, Sep., 1989.
Christy, Process Equipment Considerations For Lime Stabilization Systems Producing PSRP and PFRP Quality Sludge.
Christy, Treatment Processes Sludge Disposal Using Lime.
EPA Process Design Manual For Sludge Treatment and Disposal, Sep., 1979.
Gettings, Wurtz and King, Carbon Dixoide Addition to Alkaline Stabilized Biosolids.
EPA Environment Regulations and Technology, Control of Pathogens and Vector Attractiveness in Sewage Sludge, EPA/625,R–92/013, Dec., 1992.
Christensen, Lime Stabilization of Wastewater Sludge–An Assessment, Mar., 1981.
Christensen & Westphal, Lime Stabilization: Effectiveness of Two Process Modifications, Jun., 1982.

*Primary Examiner*—Peter A. Hruskoci
*Attorney, Agent, or Firm*—Paul & Paul

[57] ABSTRACT

A process and apparatus for treating sewage sludge having the steps of providing sludge at a desired rate, mixing the sludge with at least one alkaline additive at a proportionate rate to the sludge to raise the pH of the mixture to at least a desired level, providing a pasteurization chamber having a means to heat the contents of the chamber, continuously delivering the sludge and alkaline additive mixture to the inlet opening of the pasteurization chamber, heating the pasteurization chamber to maintain a minimum temperature of the sludge and alkaline additive mixture in the pasteurization chamber, continuously conveying the sludge and alkaline additive mixture without any substantial agitation of the mixture for a desired duration through the pasteurization chamber such that the thixotropic mixture does not become watery, and continuously discharging the sludge and alkaline additive mixture from the discharge opening of the pasteurization chamber, whereby harmful pathogens are destroyed in the sludge.

23 Claims, 2 Drawing Sheets

U.S. PATENT DOCUMENTS

| | | | |
|---|---|---|---|
| 4,443,109 | 4/1984 | Watts | 366/134 |
| 4,460,470 | 7/1984 | Reimann | 210/605 |
| 4,474,479 | 10/1984 | Redelman | 366/300 |
| 4,478,518 | 10/1984 | Tomyn | 366/156 |
| 4,514,307 | 4/1985 | Chestnut et al. | 210/751 |
| 4,541,986 | 9/1985 | Schwab et al. | 422/5 |
| 4,597,872 | 7/1986 | Anderson et al. | 210/605 |
| 4,614,587 | 9/1986 | Anderson et al. | 210/603 |
| 4,632,759 | 12/1986 | Anderson et al. | 210/603 |
| 4,659,471 | 4/1987 | Molin et al. | 210/603 |
| 4,659,472 | 4/1987 | Nordlund et al. | 210/609 |
| 4,710,032 | 12/1987 | Nordlund | 366/156 |
| 4,760,650 | 8/1988 | Theilander et al. | 34/35 |
| 4,781,842 | 11/1988 | Nicholson | 210/751 |
| 4,789,477 | 12/1988 | Nordlund | 210/520 |
| 4,852,269 | 8/1989 | Glorioso | 34/11 |
| 4,902,431 | 2/1990 | Nicholson et al. | 210/751 |
| 4,925,571 | 5/1990 | Jacob et al. | 210/742 |
| 4,981,600 | 1/1991 | Tobler et al. | 210/739 |
| 5,013,458 | 7/1991 | Christy, Sr. et al. | 210/751 |
| 5,091,079 | 2/1992 | Gayman | 210/177 |
| 5,143,626 | 9/1992 | Nugent | 210/149 |
| 5,186,840 | 2/1993 | Christy et al. | 210/709 |
| 5,229,011 | 7/1993 | Christy, Sr. et al. | 210/751 |
| 5,259,977 | 11/1993 | Girovich et al. | 210/768 |
| 5,385,673 | 1/1995 | Fergen | 210/710 |
| 5,405,536 | 4/1995 | Christy | 210/710 |
| 5,435,923 | 7/1995 | Girovich | 210/609 |

APPARATUS FOR TREATMENT OF SEWAGE SLUDGE

FIELD OF THE INVENTION

The present invention relates generally to a process for the treatment of waste prior to disposal. Additionally, the invention relates to an apparatus for the treatment of waste prior to disposal.

BACKGROUND OF THE INVENTION

The need for treating sewage sludge has increased substantially in recent years. Untreated sludge, both in solid and liquid form, may contain any number of noxious substances that are harmful to humans and the environment. These include particulate solids, organic and inorganic compounds, and pathogens.

There is developing an increasing demand, particularly with respect to municipal sewage sludge, that the treatment of sludge be sufficiently thorough to allow beneficial re-use of sludge, such as enabling the sludge to be applied to land on which agricultural and ornamental crops may be grown. While sewage sludge has beneficial plant nutrients, it also may contain bacteria, viruses, protozoa, parasites, and other microorganisms which may be disease causing. In an effort to make stabilized sludge more marketable, those treating the sludge have attempted to produce a granular, scatterable product having a soil-like texture.

One way of treating such sludge is to mix alkaline products with the sludge in a manner that blends the alkaline and sludge and transforms the otherwise watery sludge into an acceptable end product. Where this method is used without sufficient increase in sludge temperature, the resulting material is only partially stabilized. Higher pathogenic organisms are not destroyed. Sludges stabilized in this manner may be suitable for land application, but are subject to significant regulations relating to public access, harvesting and grazing.

One further method to treat waste to kill pathogens is to heat it to a high temperature for a period of time. Commonly known as pasteurization, this process neutralizes pathogens to a degree dependent upon the level of temperature and length of time that the waste is exposed to the elevated level. Where both pasteurization and the addition of an alkaline added in combination are performed, pasteurization temperatures can kill pathogenic organisms while the alkaline additive can prevent regrowth of organisms. The result can be an end product that can be stored for extended periods of time. If satisfactorily processed in this manner, sludge may be applied to lands without need for site-specific permits, according to current federal regulations, and, thus may be marketed, distributed, and sold as fertilizer.

In order to properly ensure complete pathogen reduction, the heated sludges must be held at elevated temperatures for a specific period of time. The U.S. Environmental Protection Agency has created standards which these sludges must maintain. Since these sludges are exempt from many restrictions for land application, EPA has stated:
The time-temperature requirements apply to every particle of sewage sludge processed. Time at the desired temperature is readily determined for batch operations, turbulent flow in pipes, or even monitored flow in pipes. USEPA/625/R-92/013, December 1992 (emphasis added).

The U.S. Environmental Protection Agency recognizes that the accurate measurement of time-temperature is easily accomplished in dealing with sludges of liquid consistencies, which flow through pipes, such as 0–5% dry solids content, or in batch type operations. Some difficulty may lie in ensuring the proper treatment time for sludge that has been dewatered to a solids content of approximately 10–60%, which behaves more like a solid than a liquid.

Conveying and mixing waste water sludges are difficult operations due to certain inherent characteristics of waste water sludges. Some such characteristics are the thixotropic nature of sludges, the variations in the sludge characteristics depending upon the process or methods that may be used in the waste water process, the type of sludge that is produced as a function of the community, variations in the amount of solids present in the sludge, and variations in the properties and characteristics of the alkaline materials that are used for stabilization of sludge in those instances where alkaline materials are used.

More particularly, biological sludges, particularly sewage sludges, are thixotropic. These sludges, when agitated, have the tendency to liquify. The agitation provides added mechanical energy to the sludge in order to mix the sludge with the alkaline material. Further agitation adds mechanical energy in order to move or convey the mixture through the machinery or to transport the material from one location to another. Agitation can mechanically add energy in a further attempt to granulate or break up the sludge. Sludges when exposed to such agitation become more liquid. The watery material is difficult to handle and becomes less desirable to use for agricultural purpose.

In the past, the primary method of preventing sludge from becoming watery is by the use of large quantities of alkaline materials. The present invention provides for a highly efficient use of alkaline material. The previous methods have consisted of blending waste sludge with huge quantities of alkaline material and then discharging the material into an open pile on the ground. These methods rely on the use of large quantities of alkaline materials for two primary reasons. First, the larger quantities of alkaline material are necessary to maintain a granular consistency. Second, the large quantity of alkaline material is necessary to heat the sludge sufficiently in order to overcome the tremendous heat loss that results from dumping the material into an open pile.

SUMMARY OF THE INVENTION

This invention relates to a process and apparatus for the treatment of sludge to reduce pathogens and to provide a useful end product that can be stored for an extended period and will allow beneficial re-use of sludge, such as enabling the sludge to be applied to land on which crops may be grown. The process includes preheating the sludge, mixing the sludge with an alkaline additive at a proportional rate to the sludge feed to raise the pH of the mixture to a predetermined level, and finally, retaining the heat for sufficiently long to neutralize pathogens and reduce vector attractiveness (rats, mice, and flies).

The above process is accomplished such that no substantial additional energy, other than, perhaps, heat, is added during the process whereby the thixotropic mixture does not become more watery.

More preferably, during the process, the heat of the alkaline-sludge reaction is retained and a measure of supplemental heat may be added, such that the temperature is retained at, at least 70 degrees Celsius for at least thirty minutes for neutralization of pathogens. Optionally, the chamber may be encased with insulation and a protective steel cover. Specially designed insulation may protect the chamber contents from cooling.

The combination of supplemental heat and insulation can ensure that the entire mass of material maintains the proper temperature, including the very outside edges; with no extra alkaline additive being required to overcome any heat loss, in that the material does not drop significantly in temperature within the pasteurization chamber.

Additionally, the pasteurization chamber can be furnished with multiple temperature sensors. The sensors are used to verify that the material is maintaining the proper temperature during the pasteurization.

Other methods have been attempted, such as insulating a truck bed and holding the material for a period of time within this insulated truck container. While this type of method can sometimes provide accurate time of contact and temperature parameters, such a method is not continuous and does not lend itself to larger scale operations.

This invention is an improvement upon U.S. Pat. No. 5,013,458, the complete disclosure of which is herein incorporated by reference.

This invention relates generally to a process and apparatus for the treatment of sewage sludge prior to disposal.

Accordingly, it is a general object of the present invention to provide a new and improved process and apparatus for treatment of sewage sludge.

It is another object of the present invention to provide a new and improved process and apparatus for treatment of sewage sludge for handling large volumes of sludge, in a continuous manner.

It is another object of the present invention to provide a new and improved process and apparatus for treatment of sewage sludge for handling large volumes of sludge, in a continuous manner, using a pasteurization chamber to destroy pathogens by maintaining sludge at a desired elevated temperature for a prescribed period of time.

It is another object of the present invention to provide a new and improved process and apparatus for treatment of sewage sludge for handling large volumes of sludge, in a continuous manner, using a pasteurization chamber to maintain sludge at a desired elevated temperature for a prescribed period of time, without adding any additional energy other than supplemental heat during the pasteurization process, such that the thixotropic mixture does not become watery.

Other objects and advantages of the present invention will become apparent from the following description taken in conjunction with the accompanying drawings.

DESCRIPTION OF THE PREFERRED EMBODIMENT

Figure 1:
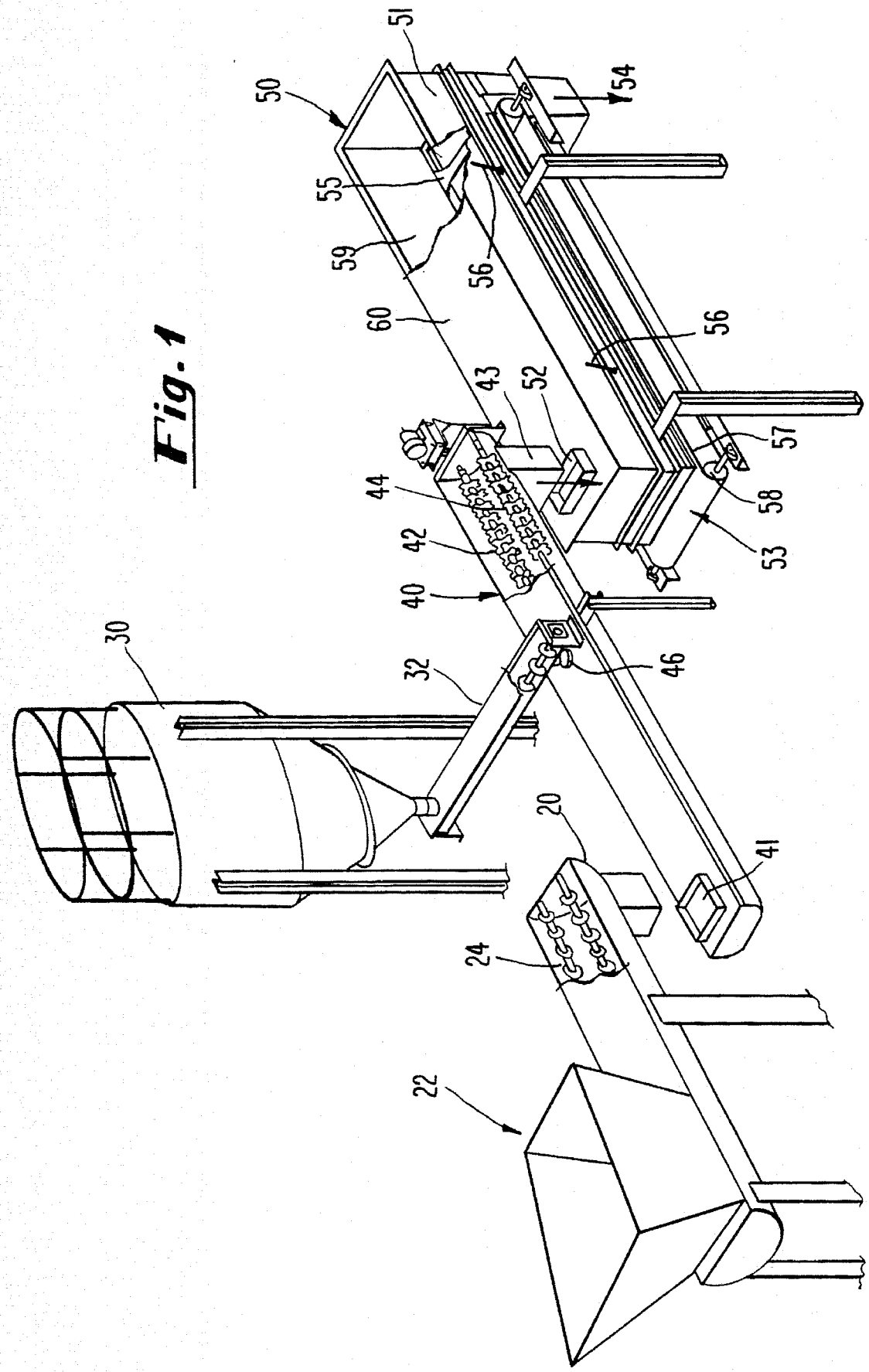
FIG. 1 is a perspective view of a process and apparatus for treatment of sewage sludge according to the present invention.
Figure 2:
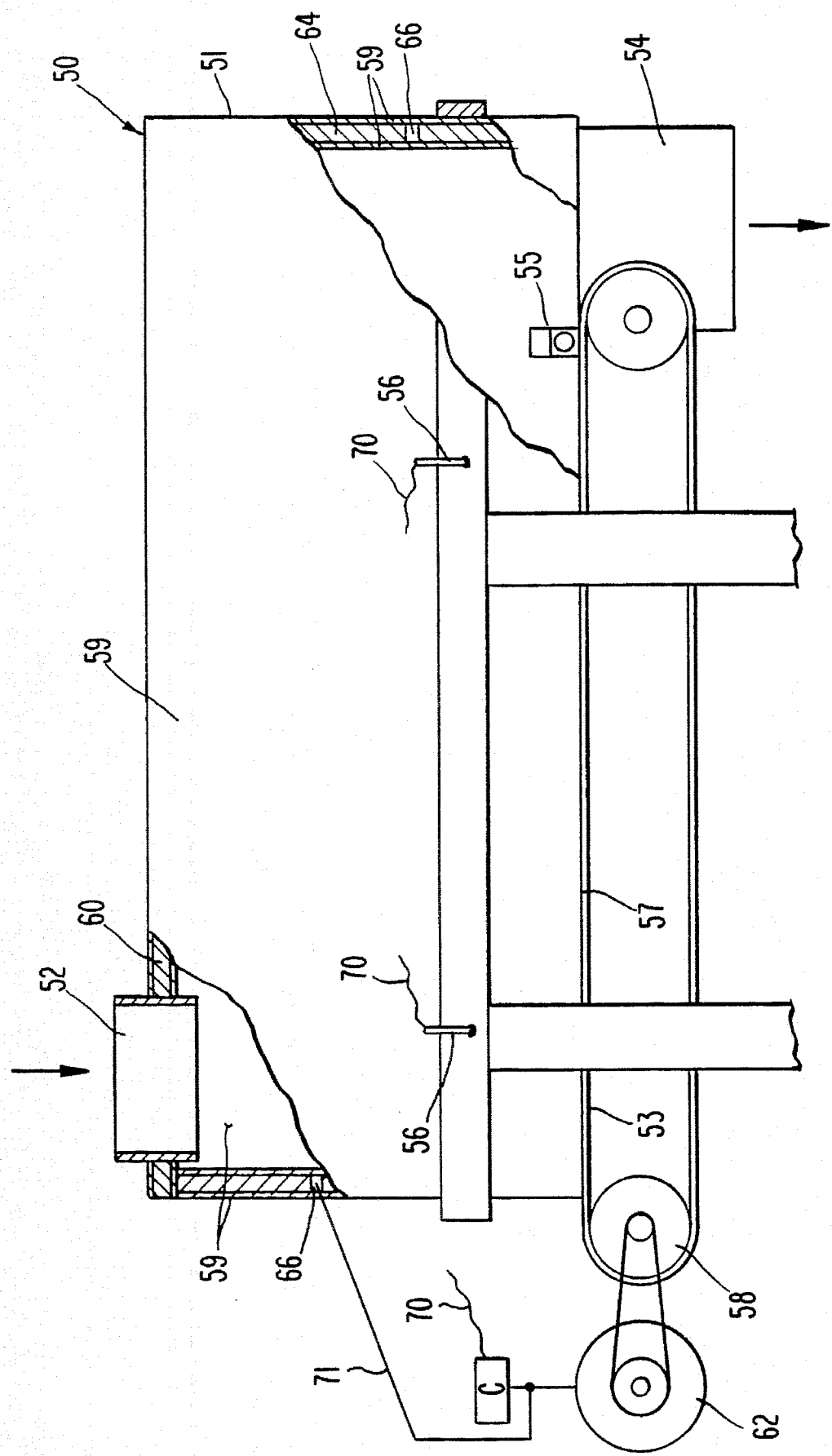
FIG. 2 is a side elevation view, partially cutaway, of the pasteurization chamber according to the present invention.

Referring now in detail to the drawings, wherein like reference numerals indicate like elements throughout the several views, there is shown in FIG. 1 an apparatus for the pasteurization of sewage sludge in accordance with one preferred embodiment of the present invention. The illustrative apparatus is shown generally comprising a conveyance means 20 to provide a continuous stream of sludge from a sludge storage and feed hopper 22, a lime storage silo 30 with a dispensing means 32, a conveying and mixing apparatus 40 for mixing the lime being dispensed from the silo with the sludge, and a pasteurization chamber 50 (see FIG. 2).

As seen in FIG. 1, in operation, sludge is dispensed to the feed hopper 22 from a sludge storage site via earth moving equipment, e.g. a bucket-equipped loader or the like. From the hopper 22, sludge is conveyed via a screw conveyance means 24 or the like, in a preferably continuous stream, to an inlet 41 of a substantially closed, elongate conveying and mixing vessel 40 having an inlet 41 and an outlet 43 on opposite ends of the vessel 40. Any of several conveyance means known in the art may be used to convey the sludge to the inlet of the mixing vessel 40, such as a conveyor belt or screw conveyor. From the inlet 41 of the conveying and mixing vessel 40, sludge is moved via a pair of generally horizontally disposed screw mixers 42, 44 toward the outlet 43 of the vessel 40. The conveying and mixing vessel 40 may be disposed at an angle preferably less than 45 degrees to the horizontal.

Additionally disposed in conveying and mixing vessel 40 are heating elements (not shown) of electric or other type, to preheat the sludge being treated, if desired. This preheating, which could potentially be created by a sludge-lime reaction as well, allows the reaction to occur more efficiently because less released heat from the hydration reaction is then necessary to be utilized to achieve the desired temperatures. Additionally, the availability of additional heat provides an ongoing "snowball" type reaction. An increase in the temperature of 10 degrees Celsius, for example, may double the reaction rate. A doubled reaction rate provides for increased heat and therefore temperature which, in turn, provides itself for a potentially further increase in temperature and, as a result, further increase in reaction rate. This "snowball" effect is sometimes referred to as an "avalanche" effect.

At a point between the inlet 41 and the outlet 43 of the conveying and mixing vessel 40, an alkaline additive inlet 46 is provided for in the conveying and mixing vessel 40. One or more suitable alkaline additives, such as lime or other alkaline additive, is metered at the desired flow rate, from the lime storage silo 30 to the conveying and mixing vessel 40, via a conveyor means 32 to the alkaline additive inlet 46. Again, here the conveyor means may include any type known in the art, including a conveyer belt type, or screw type.

Intimate mixing of the sludge and alkaline additive mixture is provided for in vessel 40 such that the pH of the sludge begins to rise, stabilizing at or above the desired level which, in the preferred embodiment, is a pH of at least about 12. The sludge-alkaline additive mixture continues through the conveying and mixing vessel 40, being further mixed as it is conveyed, and ultimately arrives, and is passed through the conveying and mixing vessel outlet 43.

The mixing of the sludge and alkaline additive at atmospheric conditions, leads to a hydration reaction:

$$CaO + H_2O = Ca(OH)_2 + Heat.$$

Using stoichiometric quantities, the reaction gives:

$$56 \text{ lbs. of } CaO + 18 \text{ lbs. } H_2O = 74 \text{ lbs. of } Ca(OH)_2$$

as well as releasing 27,500 BTU's per pound mole.

Although lime (defined here as substantially pure calcium dioxide) is preferably utilized in this embodiment, other substances consisting of or containing calcium oxide or calcium carbonate may be used, such as quicklime, dolomitic lime, or lime kiln dust or cement kiln dust. Therefore, the additive is selected from the group consisting of calcium oxide and calcium carbonate. The selection may be dependant on availability and pH level desired, because some members of the group may not be effective enough to raise the pH to the desired predetermined level. For example, if the desired predetermined pH level is twelve, dolomitic lime may not be volatile enough to raise the mixture to that level. It is important to note that the heterogeneous character of sludge, as well as the variables in the lime utilized, for example the purity, may lead to some variation in the stoichiometric equation and therefore the reaction.

After the sludge-alkaline additive mixture passes through outlet 43 of vessel 40, it passes through inlet 52 of the pasteurization chamber 50. The pasteurization chamber 50 comprises a substantially fully enclosed receptacle 51 having a continuously moving bottom 53. See FIGS. 1 and 2. The sludge-alkaline additive mixture enters through inlet 52 and is loaded, by gravity onto the continuously moving bottom bed 53 comprising an upper surface of belt 57. The moving bottom 53 is driven by a motor 62 or other type device, connected through a series of speed reduction steps, such as a series of gears, in order to provide the desired retention time. The material is conveyed by the moving bottom 53 toward discharge opening 54 at a rate such that every particle of material passing through the pasteurization chamber is enclosed within the chamber 50 for a desired dwell time. Preferably, a wiper 55 is mounted near the discharge 54 to remove material which has adhered to the moving bed. The chamber may contain a plurality of temperature probes 56 in order to provide periodic or continuous indication of the material temperature as it is conveyed through the chamber 50 and to optionally feed back temperature changes via control lines 70 to a controller C. Controller C controls the speed of motor 62 and thus controls the speed of the bed 42. Consequently the dwell time of the mixture in chamber 50 is governed.

In the preferred embodiment, the moving bed 53 consists of a single flexible rubber belt 57 driven by a drum 58 connected to a motor 62 or other drive device. The chamber walls 59 are insulated with a minimum of two inches of insulation 64 in order to minimize heat loss of material. The chamber 50 contains a cover 60 which substantially encloses the chamber 50 to help keep the mixture temperature uniform. The various walls 59 of the chamber may contain supplemental heat elements 66 to prevent radiant heat loss of material while it is in the chamber, by using feedback from sensors 56 to controller C to control power provided to elements 66 via control line 70, or otherwise.

Subsequent to entry into the pasteurization chamber 50, the sludge-alkaline additive mixture is conveyed through the pasteurization chamber 50, without any provision for additional energy other than heat. In particular, no substantial agitation energy is generated, such that the mixture, which is often thixotropic in nature, does not become watery. A minimal amount of physical working of the mixture that might be caused by engagement of the sludge-alkaline additive mixture between the moving bottom 53 of the pasteurization chamber 50 and the immediately adjacent sides of the chamber 50, or upon entry of the sludge into the chamber 50 is not considered to be substantial agitation.

In the preferred embodiment, enough heat is retained in the sludge during the course of pasteurization to maintain a temperature of at least about 70 degrees Celsius for at least 30 minutes and thereby pasteurize the sludge. It is preferred to insulate the chamber 50, as stated above, to retain the heat in order to effect efficient pasteurization. If the heat is not released from the reaction in sufficient quantities to enable the sludge to reach the desired temperature, supplemental heat may be added via the supplemental heat elements 66. The addition of supplemental heat may, in some instances, also be necessary because, although a substantial amount of heat is released during the hydration reaction, excess water in the chamber may absorb the heat. It may be possible to bleed off or release some of the excess water, but the amount remaining may still absorb undesirable quantities of heat. The combination of supplemental heat and insulation can ensure the entire mass of material maintains the proper temperature, including the very outside edges; such that no extra alkaline additive would be required to overcome heat loss, and whereby the material would not drop in temperature within the pasteurization chamber.

In the preferred embodiment, the pasteurization occurs as an ongoing process, operating continuously with sludge being introduced into the pasteurization chamber in a continuous stream, on a first-in, first-out basis, such that the particles of the beginning of the stream introduced into the chamber are the first to leave the chamber after the desired dwell time.

It is understood that while the preferred dwell time is about thirty minutes, this dwell time may be substantially varied as may be required, with use of a motor running at a different speed, or different gearing to provide a speed increase or reduction.

It is also understood that the preferred embodiment of the present invention provides a pasteurization chamber to destroy pathogens by maintaining every particle of sludge at a desired elevated temperature for a desired period of time at an elevated pH.

It is also understood that while the preferred embodiment utilizes a single chamber to retain the sludge during pasteurization and lime stabilization, it is possible to have the steps occur in separate chambers and have the sludge-alkaline additive mixture pass through each. In some instances, one might have the process occur without any enclosure in a chamber, or partial enclosure, as long as proper heat is provided or retained in the sludge.

The above invention may be provided with motor starters with ON-OFF manual controls. Additionally, control systems can be utilized to provide for automatic operations, including controlling motor speeds for sludge flow rate, alkaline additive flow rate, and dwell time in the pasteurization chamber. Moreover, computer controls from sensors 56 or otherwise (with data recording), and computer controls for control of heat elements 66 or otherwise can be utilized to provide documentation for report generation for compliance with government regulatory requirements.

Environmental Protection Agency regulations require municipalities to certify, under penalty of law, that the treated sludge complies with all regulations. The sludge treatment process of the current invention facilitates compliance with all the certifications required under 40 C.F.R. Part 503.

The above description and the figures depicted are for purposes of illustration only and are not intended to be, and should not be construed as limitations on the invention.

Moreover, certain modifications or alternatives may suggest themselves to those skilled in the art upon reading of this specification, all of which are intended to be within the spirit and scope of the present invention as defined in the appended claims.

I claim:

1. An apparatus for treating sewage sludge comprising:

(a) means for providing sludge;

(b) means for mixing the sludge with at least one alkaline additive proportionate to the sludge, such that a reaction caused by the mixing increases the temperature of the mixture to a minimum desired temperature and increases the pH of the mixture to a minimum desired level;

(c) a pasteurization chamber having at least one inlet opening and at least one discharge opening;

(d) means for delivering the sludge and alkaline additive mixture to the inlet opening of the pasteurization chamber;

(e) the pasteurization chamber comprising means for continuously conveying substantially every particle of the mixture through the chamber for a desired dwell time, without any substantial agitation of the mixture such that the mixture does not become substantially more watery, wherein said mixture is substantially enclosed in the pasteurization chamber for the desired dwell time and harmful pathogens in said mixture are substantially destroyed during said conveying; and (f) means for discharging the mixture from the discharge opening of the pasteurization chamber.

2. The apparatus of claim 1, wherein the means for providing the sludge includes means for continuously providing the sludge, and wherein the means for delivering the mixture comprises a continuous means, and wherein the means for discharging the mixture comprises a continuous means.

3. The apparatus of claim 2, wherein the pasteurization chamber includes a means to heat the mixture passing through the chamber.

4. The apparatus of claim 3, wherein the means in the pasteurization chamber to heat the mixture further includes means for heating the mixture enclosed in the pasteurization chamber to maintain the temperature of the sludge and alkaline additive mixture in the pasteurization chamber at the minimum desired temperature.

5. The apparatus of claim 4, wherein the minimum desired temperature is at least 70 degrees Celsius.

6. The apparatus of claim 2, wherein the pasteurization chamber includes a continuously moving bottom bed that moves between the inlet opening and the discharge opening of the chamber, and wherein the means to continuously deliver the mixture to the pasteurization chamber includes a means to deliver the mixture through the inlet opening of the chamber onto the continuously moving bottom bed, and wherein the means for conveying the mixture through the pasteurization chamber includes means for conveying the mixture on the bed from the inlet opening toward the discharge opening at a rate such that the mixture being conveyed on the bed is retained in the pasteurization chamber for at least the desired dwell time.

7. The apparatus of claim 6, wherein the moving bed further comprises a single flexible belt.

8. The apparatus of claim 6, wherein the pasteurization chamber having a continuously moving bottom bed further comprises a wiper means for the bed mounted near the discharge opening, to remove material which has adhered to the belt.

9. The apparatus of claim 1, wherein the means for providing the alkaline additive includes means providing an alkaline additive selected from the group consisting of calcium oxide, calcium carbonate, hydrated lime, quicklime, lime kiln dust, cement kiln dust and fly ash.

10. The apparatus of claim 1, wherein the desired dwell time is at least 30 minutes.

11. The apparatus of claim 1, wherein the minimum desired pH is at least about 12.

12. The apparatus of claim 1, wherein the means for providing the sludge includes a means for preheating the sludge to at least about 70 degrees Celsius.

13. The apparatus claim 1, wherein the pasteurization chamber includes at least one temperature sensor to provide indication of the sludge and alkaline additive mixture temperature in the chamber.

14. The apparatus of claim 1, wherein the pasteurization chamber further comprises a substantially fully enclosed receptacle with insulated walls.

15. The apparatus of claim 1, additionally including a means for controlling the addition of supplemental heat provided to the pasteurization chamber using heat sensors for sensing the temperature of the mixture in the chamber.

16. The apparatus of claim 1, wherein the means for conveying the mixture includes means for conveying each particle of the mixture such that each particle of the mixture is enclosed in the pasteurization chamber at at least the desired temperature for at least the desired dwell time.

17. In an apparatus for the treatment of sewage sludge to destroy harmful pathogens comprising a means for supplying a quantity of sludge, a means to supply a quantity of alkaline additive proportionate to the sludge such that upon mixing a minimum desired level of pH and a minimum desired temperature of the mixture is reached, a means to intimately mix the sludge and the alkaline additive, and a means to deliver the sludge and alkaline additive mixture to a pasteurization chamber to pasteurize the sludge and subsequently discharge the pasteurized sludge, the pasteurization chamber comprising:

(a) an elongate chamber having a inlet opening and a discharge opening and a continuously moving bottom bed moving between the inlet opening and the discharge opening; and (b) a drive means to move the continuously moving bottom bed at a desired speed;

wherein the sludge and alkaline mixture is delivered into the chamber through the inlet opening onto the continuously moving bottom bed, and the pasteurization chamber includes means for maintaining substantially every particle of the sludge at a minimum desired temperature for a minimum desired dwell time, to pasteurize said mixture without substantial agitation of the mixture therein, and wherein the pasteurized mixture exits the pasteurization chamber through the discharge opening.

18. The apparatus of claim 17, wherein the pasteurization chamber additionally comprises a means to heat the sludge and alkaline mixture in the chamber to maintain a minimum desired temperature.

19. The apparatus of claim 17, wherein the pasteurization chamber is substantially fully enclosed.

20. The apparatus of claim 17, wherein the pasteurization chamber is insulated.

21. The apparatus of claim 17, wherein the pasteurization chamber additionally comprises at least one temperature sensor to provide the temperature of the sludge and alkaline mixture in the pasteurization chamber.

22. The apparatus of claim 17, wherein the continuously moving bottom bed of the pasteurization chamber is a belt rotating around at least two rollers, at least one of the rollers driven by a motor having a speed reduction means.

23. The apparatus of claim 17, wherein the drive means drives the bottom bed such that the desired dwell time is at least 30 minutes and the minimum desired temperature is 70 degrees Celsius.

* * * * *